United States Patent
Werth et al.

(10) Patent No.: US 10,102,992 B2
(45) Date of Patent: Oct. 16, 2018

(54) SWITCHING APPARATUS, SWITCHING SYSTEM AND SWITCHING METHOD

(71) Applicant: Infineon Technologies AG, Neubiberg (DE)

(72) Inventors: Tobias Werth, Villach (AT); Mario Motz, Wernberg (AT)

(73) Assignee: Infineon Technologies AG, Neubiberg (DE)

( * ) Notice: Subject to any disclaimer, the term of this patent is extended or adjusted under 35 U.S.C. 154(b) by 377 days.

(21) Appl. No.: 14/189,700

(22) Filed: Feb. 25, 2014

(65) Prior Publication Data

US 2015/0243461 A1    Aug. 27, 2015

(51) Int. Cl.
| | |
|---|---|
| *H01H 47/00* | (2006.01) |
| *F02D 41/30* | (2006.01) |
| *F02P 9/00* | (2006.01) |
| *F02D 41/00* | (2006.01) |
| *F02P 7/067* | (2006.01) |
| *F02P 7/07* | (2006.01) |
| *G01D 5/244* | (2006.01) |

(52) U.S. Cl.
CPC ............ *H01H 47/00* (2013.01); *F02D 41/009* (2013.01); *F02D 41/3005* (2013.01); *F02P 7/067* (2013.01); *F02P 7/07* (2013.01); *F02P 9/00* (2013.01); *G01D 5/24452* (2013.01); *Y10T 307/766* (2015.04); *Y10T 307/826* (2015.04)

(58) Field of Classification Search
CPC .............................. F02D 41/009; F02P 7/067
See application file for complete search history.

(56) References Cited

U.S. PATENT DOCUMENTS

| | | | | |
|---|---|---|---|---|
| 3,809,956 A | * | 5/1974 | Burkel | ................. F16D 48/064 |
| | | | | 188/181 C |
| 4,575,677 A | | 3/1986 | Dennis | |
| 4,866,269 A | * | 9/1989 | Wlodarczyk | ......... F02D 41/009 |
| | | | | 250/231.18 |
| 4,914,387 A | | 4/1990 | Santos | |

(Continued)

FOREIGN PATENT DOCUMENTS

| | | |
|---|---|---|
| CN | 102789228 A | 11/2012 |
| CN | 102901836 A | 1/2013 |

(Continued)

OTHER PUBLICATIONS

Application No. PCT/EP2013/058558, dated Sep. 6, 2013, Notification of Transmittal of the International Search Report and the Written Opinion of the International Searching Authority or the Declaration, 12 pages.

(Continued)

*Primary Examiner* — Thienvu Tran
*Assistant Examiner* — Pinping Sun
(74) *Attorney, Agent, or Firm* — Schiff Hardin LLP (57) ABSTRACT

The present disclosure relates to a switching device, comprising an input for a sensor signal, the sensor signal having a sensor signal amplitude; and processing circuitry to determine a switching threshold based on the sensor signal amplitude and a weighting factor depending on said sensor signal amplitude and to generate a switching signal when a level of the sensor signal crosses the switching threshold.

22 Claims, 7 Drawing Sheets

(56) References Cited

U.S. PATENT DOCUMENTS

| | | | | |
|---|---|---|---|---|
| 4,994,738 | A | * | 2/1991 | Soyck .................... G01V 3/102 307/116 |
| 5,015,878 | A | | 5/1991 | Lasagna |
| 5,221,250 | A | | 6/1993 | Cheng |
| 5,446,375 | A | | 8/1995 | Perkins |
| 5,477,142 | A | | 12/1995 | Good |
| 5,497,084 | A | | 3/1996 | Bicking |
| 5,650,719 | A | | 7/1997 | Moody |
| 6,064,199 | A | * | 5/2000 | Walter .................... G01B 7/003 123/406.58 |
| 6,191,576 | B1 | | 2/2001 | Ricks |
| 6,221,670 | B1 | | 4/2001 | Cordell |
| 6,242,908 | B1 | * | 6/2001 | Scheller .................. G01D 3/02 324/207.12 |
| 6,275,959 | B1 | * | 8/2001 | Ransijn .................. H04L 1/205 714/705 |
| 6,279,375 | B1 | | 8/2001 | Draxelmayr |
| 6,456,063 | B1 | * | 9/2002 | Moreno ................. G01D 3/021 324/167 |
| 6,462,683 | B2 | * | 10/2002 | Draxelmayr ............ G01P 3/488 341/118 |
| 6,487,787 | B1 | | 12/2002 | Nahum |
| 6,822,597 | B2 | | 11/2004 | Draxelmayr |
| 6,888,345 | B2 | | 5/2005 | Walter |
| 6,967,477 | B1 | | 11/2005 | Murdock |
| 7,203,618 | B2 | * | 4/2007 | Hammerschmidt ... G01B 21/22 702/150 |
| 7,231,325 | B2 | | 6/2007 | Motz |
| 7,773,644 | B2 | * | 8/2010 | Oozeki ............... H01S 3/08036 372/29.015 |
| 8,705,672 | B2 | * | 4/2014 | Malipatil .......... H04L 25/03019 375/345 |
| 2003/0231013 | A1 | | 12/2003 | Faymon et al. |
| 2004/0095129 | A1 | | 5/2004 | Furlong |
| 2005/0028871 | A1 | * | 2/2005 | Kurita .................... F02D 9/105 137/554 |
| 2006/0071659 | A1 | * | 4/2006 | Tatschl ................. G01D 5/2492 324/207.25 |
| 2009/0001965 | A1 | * | 1/2009 | Ausserlechner ....... G01D 5/145 324/202 |
| 2009/0140725 | A1 | * | 6/2009 | Ausserlechner ..... G01R 33/072 324/207.2 |
| 2009/0189110 | A1 | * | 7/2009 | Dolenti ................ F02D 11/106 251/356 |
| 2009/0326860 | A1 | | 12/2009 | Hainz |
| 2010/0127700 | A1 | | 5/2010 | Sugiura |
| 2011/0298450 | A1 | | 12/2011 | Foletto |
| 2013/0177040 | A1 | | 7/2013 | Foletto et al. |
| 2013/0270899 | A1 | * | 10/2013 | Buttolo ................ H03K 17/955 307/9.1 |
| 2014/0077873 | A1 | * | 3/2014 | Motz ....................... H03F 3/387 330/9 |
| 2014/0222364 | A1 | * | 8/2014 | Foletto .................. G01D 5/247 702/104 |
| 2015/0061656 | A1 | * | 3/2015 | Fernandez ............ G01B 7/003 324/207.25 |

FOREIGN PATENT DOCUMENTS

| | | | |
|---|---|---|---|
| CN | 103161598 A | 6/2013 | |
| DE | 102 23 767 A1 | 12/2003 | |
| DE | 10 2011 053 565 A1 | 3/2012 | |
| FR | 2860587 A1 | 4/2005 | |
| WO | WO 1987/06348 | 10/1987 | |
| WO | WO 2004/079385 | 9/2004 | |
| WO | WO 2012/089366 A1 | 7/2012 | |
| WO | WO 2013/017211 A1 | 2/2013 | |
| WO | WO 2013017211 A1 * | 2/2013 | ........... G01R 33/091 |

OTHER PUBLICATIONS

Allegro Microsystems, Inc., *Dynamic, Self-Calibrating, Peak-Detecting, Differential Hall Effect Gear Tooth Sensor IC*, ATS612LSG Datasheet, © 2001, 16 pages.

Infineon Technologies, *TLE5027C E6747 GMR Based Crankshafte Sensor*, Datasheet V. 1.0, Sep. 2009, 33 pages.

Infineon Technologies, *Dynamic Differential Hall Effect Sensor IC TLE 4921-3U*, Jan. 7, 2000, pp. 1-19.

Braun, R. J., *Modular Hall Master Slice Transducer*, IBM J. Res. Develop., pp. 344-352, Jan. 22, 1975.

Bates, et al., *Integrated Semiconductor Magnetic Field Sensors*, IEEE, © 1986, pp. 1107-1132.

Draxelmayr et al., *A Self-Calibrating Hall Sensor IC with Direction Detection*, IEEE Journal of Solid-State Circuits, vol. 38, No. 7, Jul. 2003, pp. 1207-1212.

Application and file history for U.S. Appl. No. 13/532,152, filed Jun. 25, 2012, Inventors: Mialtu et al.

Office Action dated Oct. 28, 2016 for Chinese Patent Application No. 201510087014.6.

* cited by examiner

SWITCHING APPARATUS, SWITCHING SYSTEM AND SWITCHING METHOD

TECHNICAL FIELD

Embodiments relate to a switching device, a switching apparatus and a switching method, which may be used for motor management applications, for example.

BACKGROUND

In the field of automotive engineering the application of switching devices to operate actuators based on one or more sensor signals is commonly known. In particular, when optimizing the operation of a combustion engine, it may be necessary to adapt the operation of a fuel injection system to the operation of valves for closing and opening one or more air inlets or one or more an air outlets to a combustion chamber, wherein the operation of said valves is caused by a camshaft, and/or to adapt the operation of an ignition system to the operation of a piston, which is moved by a crankshaft. In order to allow such adaptation of the above mentioned operations one or more switching signals may be used. Thereby a switching signal may be triggered based on a level of a sensor signal.

SUMMARY

According to a first aspect the present disclosure provides a switching device. The switching device comprises an input and a processing circuitry. The input is configured to receive a sensor signal having a sensor signal amplitude. The processing circuitry is configured to determine a switching threshold based on the sensor signal amplitude and a weighting factor, wherein the weighting factor depends on the determined sensor signal amplitude. The processing circuitry is further configured to generate a switching signal when a level of the sensor signal crosses the switching threshold.

In some embodiments the processing circuitry may be configured to adapt the weighting factor and hence the switching threshold to variations of the sensor signal amplitude over time.

According to a further aspect the present disclosure provides a switching system such as, for example, a switching system for providing a digital speed signal corresponding to a rotating movement. The switching system may be a speed sensor device such as a speed sensor device taken from the group consisting of magnetic camshaft speed sensors, magnetic crankshaft speed sensors, magnetic ABS speed sensors, or magnetic transmission speed sensors. The switching system comprises a magnetic field sensor spaced apart from a rotatable target body by a gap. Further, the switching system comprises a processing circuitry. The magnetic field sensor is configured to output a sensor signal indicative of an oscillating magnetic field indicating an angular position of the rotatable target body. The sensor signal may be an analog signal or a digital signal representing values of the sensed magnetic field. The sensor signal has a sensor signal amplitude depending on a width of the gap. The sensor signal amplitude can be regarded as the difference between a maximum value of the sensor signal and a minimum value of the sensor signal. The processing circuitry is configured to determine a switching threshold based on the sensor signal amplitude and a weighting factor depending on the sensor signal amplitude. The processing circuitry is further configured to generate a switching signal when a level of the sensor signal crosses the switching threshold. Thus, the digital output signal of the switching system switches from a first value to a second value when the sensor signal crosses the switching threshold.

According to yet a further aspect of the present disclosure it is provided a switching method. According to said switching method, a sensor signal having a sensor signal amplitude is received. The sensor signal amplitude and a weighting factor depending on said sensor signal amplitude are used to determine a switching threshold. The determined switching threshold may then be used to determine the next switching of the digital output signal when the sensor signal next crosses the determined switching threshold. When a level of the sensor signal crosses the switching threshold, a switching signal is generated.

Some embodiments comprise a digital control circuit installed within the switching device for performing the method. Such a digital control circuit, e.g. a digital signal processor (DSP), needs to be programmed accordingly. Hence, yet further embodiments also provide a computer program having a program code for performing embodiments of the method, when the computer program is executed on a computer or a digital processor.

BRIEF DESCRIPTION OF THE FIGURES

Some embodiments of apparatuses and/or methods will be described in the following by way of example only, and with reference to the accompanying figures, in which.

DESCRIPTION OF EMBODIMENTS

Various example embodiments will now be described more fully with reference to the accompanying drawings in which some example embodiments are illustrated. In the figures, the thicknesses of lines, layers and/or regions may be exaggerated for clarity.

Accordingly, while example embodiments are capable of various modifications and alternative forms, embodiments thereof are shown by way of example in the figures and will herein be described in detail. It should be understood, however, that there is no intent to limit example embodiments to the particular forms disclosed, but on the contrary, example embodiments are to cover all modifications, equivalents, and alternatives falling within the scope of the invention. Like numbers refer to like or similar elements throughout the description of the figures.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Figure 1:
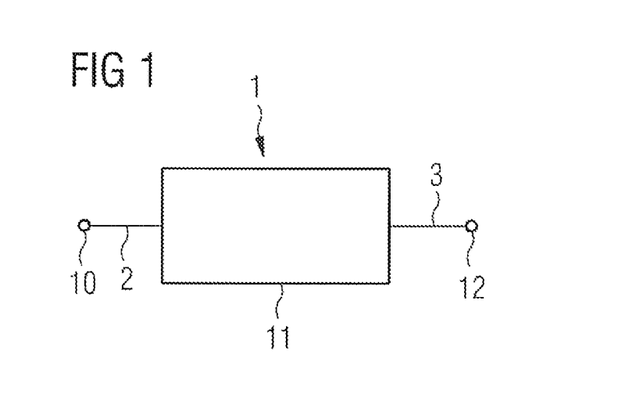
FIG. 1 illustrates a switching device to determine a switching signal based on a sensor signal amplitude.

FIG. 1 presents a schematic illustration of a switching device 1 according to an embodiment.

The switching device 1 comprises an input 10. The input 10 is adapted to receive a sensor signal 2 having a sensor signal amplitude. Further, the switching device 1 comprises processing circuitry 11 which is configured to determine a switching threshold based on the sensor signal amplitude and based on a weighting factor, wherein the weighting factor itself is determined dependent on said sensor signal amplitude during at least one time interval. The processing circuitry 11 is further operable to generate a switching signal when a level of the sensor signal crosses the switching threshold. The weighting factor may be regarded as a factor weighting the sensor signal amplitude to determine or calculate of the switching threshold. While the weighting factor is indicative of a relative switching threshold, the resulting determined switching threshold may be regarded as an absolute switching threshold of the sensor signal.

In some embodiments the sensor signal may have one particular sensor signal amplitude for a given sensor setup and for given environmental conditions, e.g. changes in ambient temperature or abrasion, and the amplitude dependent weighting factor may depend on this particular sensor signal amplitude. In some implementations, the sensor signal amplitude may be substantially constant over time and the amplitude dependent weighting factor may depend on said substantially constant sensor signal amplitude. In some other implementations the sensor signal amplitude may be substantially constant over a period of time, during which no significant variations of the environmental conditions appear. The weighting factor may hence depend on the substantially constant sensor signal amplitude for at least said period of time. The term "substantially constant" may be understood as including slight variations of the sensor signal amplitude such as less than 5%, less than 2%, or less than 1% of the sensor signal amplitude.

In embodiments the sensor signal amplitude may however differ for different sensor setups for sensing a physical quantity, such as a magnetic field, for example. In alternative embodiments the physical quantity may be a temperature or of a pressure, for example.

The sensor signal may be an oscillating signal having a plurality of minima and a plurality of maxima. In some embodiments, the minima of the sensor signal may have a substantially identical minimal value and the maxima may have a substantially identical maximum value resulting in that the sensor signal amplitude is substantially constant over time or at least a period of time during which no significant variations of the environmental conditions appear. In other words, an envelope of the sensor signal may be substantially constant. The term "substantially" may express that smaller variations may appear due to sensitivity and mounting tolerances.

In some other embodiments at least some of the maxima or some of the minima of an oscillating sensor signal may have different values resulting in several different sensor signal amplitudes. Precisely one sensor signal amplitude of the different sensor signal amplitudes corresponding to the sensor signal amplitude underlying the amplitude dependent weighting factor may be used to determine the switching threshold. This sensor signal amplitude may be the highest, the lowest or any intermediate sensor signal amplitude of the different sensor signal amplitudes. In other words, the sensor signal may be divided in subsequent intervals leading to only one single sensor signal amplitude, respectively. The sensor signal amplitude of one of the intervals may be used as the sensor signal amplitude to determine the switching threshold in some embodiments. In some other implementations, an averaged sensor signal amplitude may be used to determine the weighting factor and the switching threshold. The averaged sensor signal may be an average over a number of subsequently determined amplitudes, a number of continuously recurring amplitudes or of all determined amplitudes.

In some implementations the sensor signal amplitude may be a peak-to-peak amplitude between a minimum and an adjacent maximum of the sensor signal. The peak-to-peak amplitude may be determined based on the difference of the maximum and the minimum of the sensor signal. The maximum may be directly subsequent to the minimum of the sensor signal, and vice versa. The amplitude dependent weighting factor leading to the switching threshold may be determined dependent on the peak-to-peak amplitude—it may be a function of the peak-to-peak amplitude.

The switching threshold may be derived based on a minimum of the sensor signal, a maximum of the sensor signal, and the amplitude dependent weighting factor. In some embodiments the threshold may be determined based on a sum of the minimum of the sensor signal and a product of the weighting factor and the sensor signal amplitude. In other words, the switching threshold may be determined corresponding to $$TS = Min + w*(Max-Min),$$

wherein TS is the switching threshold, Min is the minimum of the sensor signal, w is the amplitude dependent weighting factor and (Max−Min) is the (peak-to-peak) amplitude of the sensor signal.

In some embodiments the processing circuitry 11 may be configured to determine the amplitude dependent weighting factor w proportional to the sensor signal amplitude. The amplitude dependent weighting factor w may be a linear function of sensor signal amplitudes of different sensor signals. The processing circuitry may be configured to determine the amplitude dependent weighting factor w inversely proportional to the sensor signal amplitude. In other words, the weighting factor w may be a linear function of sensor signal amplitudes of different sensor signals.

In some implementations the weighting factor and hence the switching threshold may be adapted to variations of the sensor signal amplitude over time and a currently adapted weighting factor may be directly used for determining the current threshold and hence for generating the current switching signal. In some embodiments the sensor signal amplitude may be determined continuously or periodically so as to detect variations of the sensor signal amplitude. Dependent on the variations of the sensor signal amplitude over time, the weighting factor may be adapted during operation. In other words, the weighting factor is not pre-determined neither at the moment of power on nor during subsequent operation. Instead, the weighting factor may be fully adaptive and may be changed during a first turn of the rotatable target body or during subsequent operation.

In some embodiments the sensor signal amplitude may be indicative of a sensed magnetic field, for example. The sensor signal amplitude may depend on a width of a gap between a magnetic field sensor providing the sensor signal and a target body, which may be rotatable or rotating. Thereby the target body may have effect on an amplitude of a magnetic field strength due to its rotation and a resulting angular position. As the sensor signal amplitude may vary with the width of the gap between the magnetic field sensor and the rotatable target body in some embodiments the amplitude dependent weighting factor w may also depend on the width of said gap.

In some embodiments where the sensor signal 2 is indicative of a sensed magnetic field the switching device's input 10 may provide an interface to a magnetic field sensor providing the sensor signal 2. Thereby the magnetic field sensor may be one of the group a Hall sensor, a Magneto-Resistive sensor (XMR sensor) or other suitable magnetometers. A Hall sensor is based on the principle of the commonly known Hall Effect, while a XMR sensor may be based on the principle of Ordinary Magneto-Resistance (OMR), Giant Magneto-Resistance (GMR), Colossal Magneto-Resistance (CMR), or Tunnel Magneto-Resistance (TMR). In some embodiments the sensor signal 2 may reflect a rotation of a rotatable target body and may allow determining an angular position of the rotatable target body. For example, the rotatable target body may be attached to or may be a part of a camshaft or a crankshaft of a combustion engine. The sensed magnetic field may be generated by a back bias magnet placed at a rear side of the magnetic field sensor, the rear side being arranged opposite to the side oriented toward the rotatable target body. In other embodiments the magnetic field may be generated by the rotatable target body formed as magnetized ring wheel, which may be a pole wheel, or as a magnetized cylindrical portion of a rotatable shaft.

As also indicated by FIG. 1, the switching device 1 may further have an output 12 to output the determined switching signal 3. In some implementations the output 12 may provide an interface to at least one actuator of the group of a valve controller, a fuel injection controller, or an ignition controller of a combustion engine, in order to control said actuator by means of the switching signal.

Figure 2:
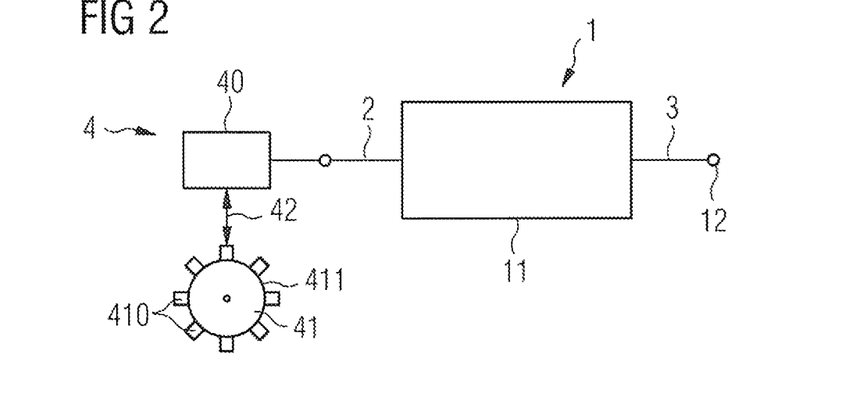
FIG. 2 illustrates a switching apparatus in relation to a rotatable target body, the rotation of which being indicated by a sensor signal.

FIG. 2 schematically illustrates a switching system 4 according to an embodiment.

The switching system 4 comprises a magnetic field sensor 40 and an embodiment of the switching device 1. The magnetic field sensor 40, which may be a Hall sensor, an XMR sensor or another suitable magnetometer, is arranged spaced apart from a rotatable target body 41 by a gap 42, which may be an air gap. The rotatable target body 41 does in many embodiments not need to be part of the switching apparatus 4.

The magnetic field sensor 40 is configured to output a sensor signal 2 indicative of an oscillating magnetic field due to a rotation of the target body 41. The oscillating magnetic field and, hence, the sensor signal 2 may indicate a current angular position of the rotating target body 41. The sensor signal 2 may have a substantially constant sensor signal amplitude which is dependent on a width of the gap 42. Due to mounting tolerances during manufacturing, for example, the gap 42 may have a width in the range of 0.1 mm to 3 mm, more particularly in the range of 0.2 mm to 2 mm, or even more particularly in the range of 0.2 mm to 1.4 mm. The gap 42 affects the amount of the sensor signal amplitude. In other implementations the target body may be designed in a way that the sensor signal 2 may comprise a sequence of several different sensor signal amplitudes recurring after one turn of the target body. In other words, the sensor signal may comprise a sequence of oscillations, each oscillation corresponding to a tooth of a slot or the like of a target body. The sequence of oscillations is repeated for every turn of the target body. One of said different sensor signal amplitudes or an average of some or all sensor signal amplitudes may be indicative of a width of the gap 42.

In some other embodiments the sensor signal amplitude may vary over time due to variations of the environmental conditions or other influences. Hence an average over at least some of the detected sensor signal amplitudes may be used as basis for determining the weighting factor and the switching threshold.

In some embodiments, the rotatable target body 41 may comprise a wheel attached to a rotatable shaft or a portion of the rotatable shaft. The rotatable shaft may be e.g. a camshaft or a crankshaft, as will be explained in more detail with respect to FIG. 4a.

The rotatable target body 41 may comprise a coding pattern containing at least one of the group of a tooth 410, a slot, a hole or a region of inverted magnetic polarity. In some embodiments the rotatable target body 41 has a surface 411 formed like an outer surface of a hollow right circular cylinder which is provided with one or more teeth 410. In alternative embodiments the surface 411 of the rotatable target body 41 may be provided with one or more slots. Additionally or alternatively the rotatable target body may be made of a magnetic material, wherein a magnetic polarity thereof may be inverted in some areas of the rotatable target body 41.

In some embodiments the coding pattern may comprise teeth of substantially identical height or slots of substantially identical height or holes of substantially identical radial extension or regions of inverted magnetic polarity having substantially identical field strength. The term "substantially" may be understood as including variations of a quantity such as the height of the teeth or the slots, the radial extension of the holes or the magnetic field strength of the regions of inverted polarity, of less than 5%, preferably less than 2%, more preferably less than 1% of the corresponding quantity due to fabrication tolerances. Use of rotatable target bodies having such coding pattern may result in a sensor signal having a substantially constant sensor signal amplitude. This may lead to a sensor signal having only one substantially constant sensor signal amplitude.

In some other embodiments the coding pattern may comprise teeth of different height or slots of different height or holes of different radial extension or regions of inverted magnetic polarity having different field strength. Use of rotatable target bodies having such coding pattern may result in a sensor signal having a sequence of different sensor signal amplitudes. However, the weighting factor may be determined with respect to a sensor signal amplitude corresponding to one of a particular tooth, slot, hole or region of inverted magnetic polarity.

In some applications, the rotatable target body 41 may comprise a metallic material, in particular a ferrous material, while the magnetic field sensor 40 may be provided with a magnet (not shown by the figures). In some implementations said magnet may be a back bias magnet, arranged at a side of the magnetic field sensor 40, which is opposite to the side of the magnetic field sensor 40 oriented towards the rotatable target body 41.

In some other applications the rotatable target body 41 may comprise a magnetic material or may be made of a magnetic material. In some embodiments the rotatable target body may be a magnetized ring wheel or a magnetized portion of a rotatable shaft. In these applications the provision of a magnet to the magnetic field sensor 40 may not be required. As has been explained before, the processing circuitry 11 of the switching device 1 is configured to determine a switching threshold based on the sensor signal amplitude and a weighting factor w depending on said sensor signal amplitude. For example, the sensor signal amplitude may be a peak-to-peak amplitude between a minimum and a maximum of the sensor signal. The processing circuitry 11 may be configured to determine the amplitude dependent weighting factor based on the peak-to-peak amplitude. The processing circuitry 11 may further be configured to determine the switching threshold based on the minimum of the sensor signal, the maximum of the sensor signal, and the amplitude dependent weighting factor w. In some embodiments, the processing circuitry 11 may be configured to determine the amplitude dependent weighting factor w proportional to the sensor signal amplitude. In some further embodiments, circuitry 11 may be configured to determine the amplitude dependent weighting factor inversely proportional to the sensor signal amplitude. In some implementations the processing circuitry 11 may generate the switching signal only when the sensor signal 2 falls below the switching threshold. In other implementations the processing circuitry 11 may generate the switching signal only when the sensor signal 2 rises above the switching threshold, and in further implementation, when the sensor signal 2 falls below the switching threshold and when the sensor signal 2 rises above the switching threshold.

The switching system 4 may further comprise a memory. The memory may be provided to store at least a fixed switching threshold constant for all sensor signal amplitudes. The fixed switching threshold may be foreseen to be used directly after switching on the switching system or in case, that the processing circuitry is not able to determine the amplitude dependent weighting factor and hence the amplitude dependent switching threshold. The fixed switching threshold may in some embodiments in the field of automotive applications be a true power on (TPO) value.

In some embodiments the weighting factor may be adapted during operation. The processing circuitry may be configured to determine a first maximum of the sensor signal and a first minimum of the sensor signal directly after starting the switching device and to calculate a first peak-to-peak amplitude as basis for determination of the adaptable weighting factor. After determination of the amplitude dependent switching threshold from the weighting factor, the processing circuit generates the switching signal when the sensor signal crosses the amplitude dependent switching threshold. As soon as a second maximum may be determined, the weighting factor may be adapted to a peak-to-peak amplitude of the first minimum and the second maximum or to an average amplitude.

In some embodiments the amplitude dependent weighting factor may be determined already after the first maximum of the sensor signal has been detected. The processing circuitry may be configured to calculate a difference between the first maximum and the fixed switching threshold. This difference may be used as a first sensor signal amplitude to determine the weighting factor. As soon as the processing circuitry detects a first minimum of the sensor signal, the weighting factor is adapted to the peak-to-peak amplitude corresponding to the first maximum and the first minimum. Subsequently, the adaptation may be continued as described above.

In some embodiments the switching system may comprise a further memory to store a current amplitude dependent weighting factor. Thus, it is possible to store the weighting factor which was used until the switching system was turned off for the last time. When the switching system is restarted, a switching threshold based on the stored weighting factor may be used before the processing circuitry detects at least the first maximum of the sensor signal.

Figure 3:
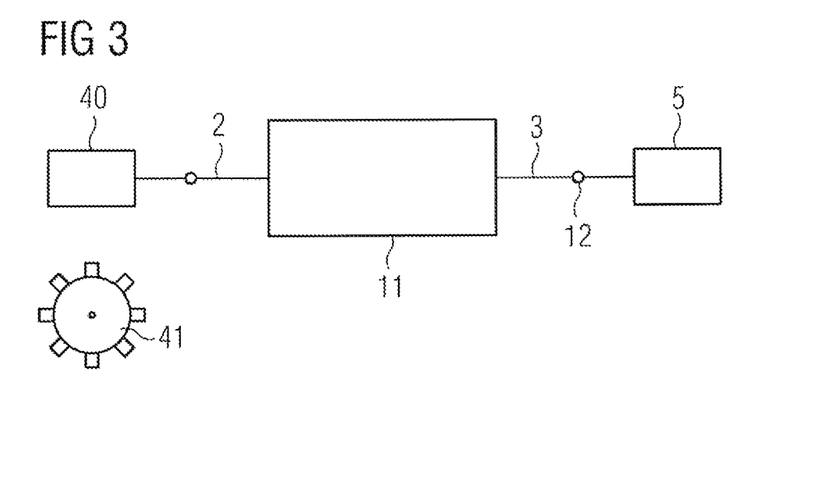
FIG. 3 depicts the switching apparatus of FIG. 2 in relation to a rotatable target body and connected to an actuator.

As presented in FIG. 3, the processing circuitry 11 of the switching device 1 may be coupled to the output 12 to an actuator 5 to transmit the switching signal 3 from the processing circuitry 11 to the actuator 5. The actuator 5 may be in some embodiments at least one of the group of a valve controller, a fuel injection controller or an ignition controller of a combustion engine. For example, the switching signal 3 may control a switch, such as a transistor, of the actuator 5.

Figure 4:
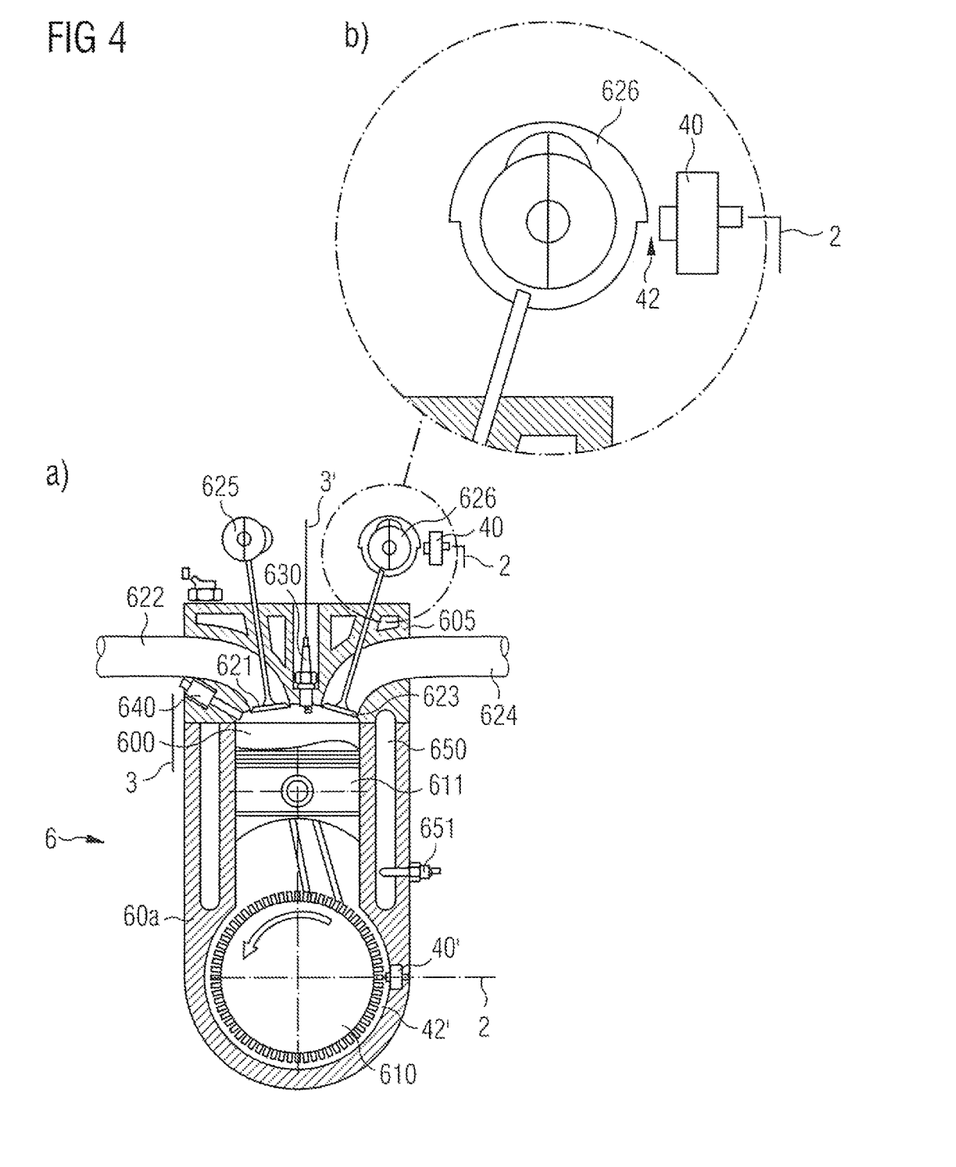
FIG. 4 illustrates a combustion engine provided with switching devices arranged to control fuel injection and ignition.

FIG. 4a illustrates a combustion engine 6 which may be coupled to switching device according to embodiments.

The combustion engine 6 comprises a cylinder block 60a and a cylinder head 60b. The cylinder block 60a houses a crankshaft 610 and a piston 611, operated by the crankshaft 610. The piston 611, the cylinder block 60a and the cylinder head 60b together form a combustion chamber 600, which is expandable and shrinkable by the motion of the piston 611. An air inlet 622 and an air outlet 624, which are in communication with the combustion chamber 600, are formed in the cylinder head 60a. The air inlet 622 and the air outlet 624 are provided with a first valve 620 and a second valve 623, respectively, to control air flow to and from the combustion chamber 600. The first valve 621 and the second valve 623 are operated by a first camshaft 625 and a second camshaft 626, respectively. In some implementations the combustion engine 6 may have more than one air inlet and more than one air outlet. In these implementations, the first camshaft 625 and the second camshaft 626 may be configured to operate more than one valve to control air flow from the air inlet and to the air outlet.

The combustion engine further includes an ignition device 630, which may in some embodiments be arranged in the cylinder head 60b in an area between the first and the second valve 621, 623. Besides, the combustion engine may further include a fuel injection device 640, which may in some implementation may be arranged in the cylinder head 60b next to the first valve 621. In a region next to the combustion chamber 600 and the piston 611, the cylinder block 60a may include a cooling water system 650. The cooling water system 650 may be monitored by a temperature sensor 651 so as to allow control of the cooling water system 650 dependent on a measured temperature of cooling water.

In proximity of the second camshaft 626 a magnetic field sensor 40 of a switching device (not fully presented by FIG. 4a) may be arranged. The magnetic field sensor 40 may be configured to monitor the rotation of the camshaft 626 and to output a sensor signal 2 indicative of the rotation and/or angular position of the camshaft 626. In the embodiment of FIG. 4b the magnetic field sensor 40 in relation to the second camshaft 626 is presented in enlarged illustration. FIG. 4b in particular shows that the magnetic field sensor 40 may be spaced apart from the second camshaft 262 by an air gap 42. Said gap 42 may slightly vary for reasons of mounting tolerances during production of the engine 6 or parts thereof. Said air gap 42 affects the sensor signal's amplitude, in particular its peak-to-peak amplitude.

The sensor signal 2 may be indicative of the sensed magnetic field and thereby also of an angular position of the second camshaft 626. In some implementations, the sensor signal 2 may be transmitted to a switching device according to embodiments, which is configured to determine an amplitude dependent switching threshold. The switching threshold is based on the sensor signal amplitude and a weighting factor w, which is itself dependent on the sensor signal amplitude. In other words, said weighting factor w is dependent on a width of the air gap 42 between the magnetic field sensor 40 and the second camshaft 626 and, hence, may compensate for mounting tolerances with regard to a distance between the target body and the magnetic field sensor 40. The switching device is further configured to generate a switching signal when the sensor signal 2 crosses the non-predetermined (variable) switching threshold. According to some embodiments the switching signal 3 provided by the switching device may be transmitted to a control unit of the fuel injection device 640 for operating the fuel injection device 640, in particular in order to provide fuel to the combustion chamber 600 at a suitable moment.

In some embodiments a magnetic field sensor 40' of a switching device (not fully depicted in FIG. 4a) may be arranged in proximity to the crankshaft 610. Since the arrangement and the operation of the magnetic field sensor 40' with respect to the crankshaft 610 are comparable to those of the magnetic field sensor 40 with respect to the second camshaft 626, a further explanation is omitted. According to some embodiments a switching signal 3' output by the magnetic field sensor 40' may be transmitted to a control unit of the ignition device 630 so as to initiate ignition at a suitable moment.

It is to be noted that at least one of the second camshaft and the crankshaft or even both of them may be monitored by a magnetic field sensor connected to a switching device to generate a switching signal. In further embodiments also the first camshaft 625 or other rotatable target bodies of the combustion engine 6 may be monitored by a magnetic field sensor connected to a switching device to operate an actuator of the combustion engine 6.

Figure 5:
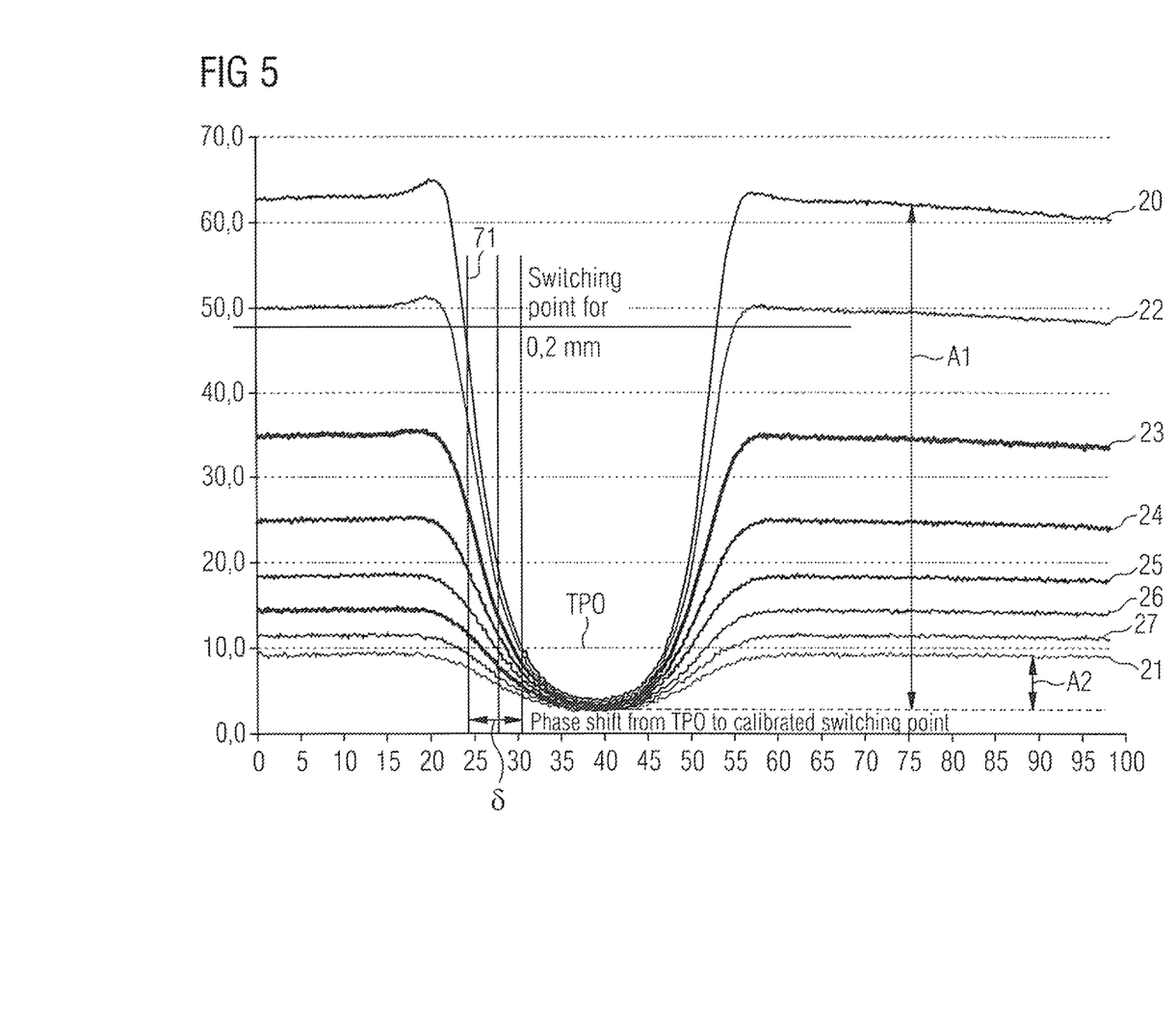
FIG. 5 displays a series of sensor signals recorded for different air gaps between a rotatable body and a sensor and indicates a fixed switching threshold.

FIG. 5 depicts a plurality of sensor signal sequences corresponding to various widths of air gaps 42 between the magnetic field sensor 40 and the rotatable target body 41 in the range of 0.2 mm to 2 mm. The sensor signal 20, which has the highest sensor signal amplitude or highest peak-to-peak amplitude A1 in this example, is indicative of an air gap of 0.2 mm. The sensor signal 21 having the smallest sensor signal amplitude or smallest peak-to-peak amplitude A2 in this example is indicative of an air gap of 2 mm. The sensor signals 22 to 27 have decreasing sensor signal amplitudes and correspond to intermediate air gaps in between 0.2 mm and 2 mm.

Each sensor signal 20 to 27 indicates a change of a sensed magnetic field caused by the rotation of a rotatable body having a tooth over the rotation angle. In FIG. 5 the sensor signals 20 to 27 are only illustrated for rotation angles in the range of 0° to 98°. The highest level of the sensor signals 20 to 27 represent a surface of the rotatable target body which may be formed like an outer surface of a hollow right circular cylinder, such as the surface 411 in FIG. 2, for example. At a rotation angle of about 20° an edge of a tooth provided on the cylinder-like surface starts to rotate in the sensing area of the magnetic field sensor and causes the magnetic field to decrease. At a rotation angle of about 38° the tooth is fully in the sensing area of the magnetic field sensor as indicated by the minimum of the sensor signal. During further rotation of the rotatable target body the tooth rotates out of the sensing region so that the sensor signal increases until it reaches a maximum value indicating the cylinder-like surface of the rotatable target body.

However, even though the sensor signals are described here with respect to a precise embodiment, there may be implementation, in which a minimum of a sensor signal may indicate the presence of a slot provided in the cylinder-like surface of the applied rotatable target body. In other embodiments the sensor signals may have a maximum level representing a tooth or a slot and a minimum level indicating a basic surface of the rotatable target body.

At a value of 10 mT FIG. 5 shows a level (horizontal line), which indicates a predetermined true power on (TPO) value, which is stored in a memory. The TPO value is used as switching threshold directly after starting the setup, in some embodiments the combustion motor. After one or a few rotation cycles of the rotatable target body, the TPO is replaced by a switching threshold adapted to the arrangement of the magnetic field sensor, in particular to the width of the air gap between the magnetic field sensor and the rotatable target body. Furthermore, the TPO may be used, if no air gap dependent switching threshold is available. The TPO value may be usually chosen in proximity to extremal levels of the sensor signals 20, 22 to 27 so that all possible air gaps cross the TPO. In FIG. 5 the sensor signal 21 sensed for an air gap of 2 mm does not cross the TPO level, so that no switching can be performed directly after turning on the set up.

Figure 6:
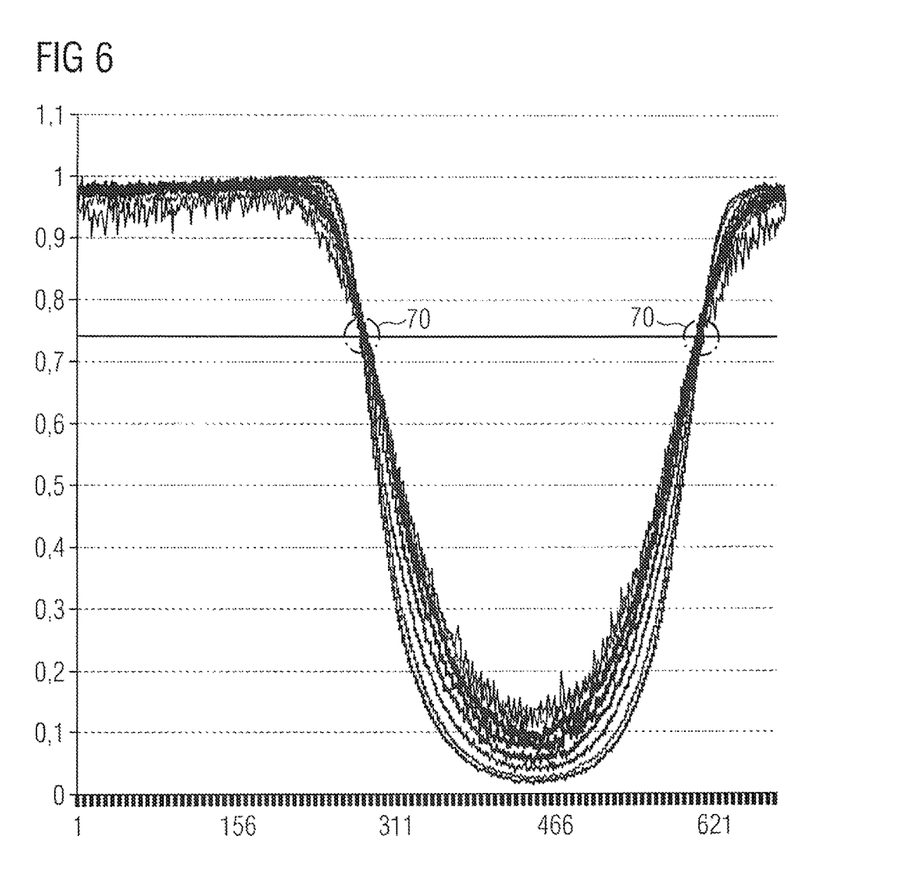
FIG. 6 shows a normalized representation of the sensor signals of FIG. 5.

Conventionally, the switching threshold may be determined as follows: The sensed sensor signals 20 to 27 of FIG. 5 are normalized with respect to their amplitudes as shown by FIG. 6. As can be taken from FIG. 6, the normalized sensor signals have similar form, but there is only one matching point 70 at each edge of the curve. For the implementation underlying the sensor signals 20 to 27 presented by FIG. 6 the matching point may be determined to a constant factor of 0.75. Thus, the switching level is determined to the sum of the minimal level of the sensor signal and 75% of the peak-to-peak amplitude of the sensor signal. In other words, the switching level SL is determined by the formula SL=Min+(Max−Min)kj, wherein Min is the minimum of the sensor signal, Max−Min is the peak-to-peak amplitude of the sensor signal and k is the constant factor 0.75 for all sensor signal amplitudes.

However, this constant factor may vary depending on the type and design of the rotatable target body or rather from the type and structure of the magnetic field sensor. For other structures and designs of the rotatable target body and rather the magnetic field sensor, the matching point may vary and the constant factor j may be in the range of 0.65 to 0.90.

Turning back to FIG. 5, one can see a vertical line 71 at a rotation angle of about 24.5° which crosses the sensor signals 20 to 27 at a value corresponding to the sum of the minimum level of the corresponding sensor signal and 75% of the peak-to-peak amplitude A1, A2 of the corresponding sensor signal, namely the switching level. As can be taken from FIG. 5, for the sensor signal 20 a phase shift δ between the switching threshold and the points, where the TPO crosses the sensor signals, increases with decreasing peak-to-peak amplitude or decreasing width of the air gap for the sensor signals 20, 22 to 26 for air gaps smaller than 2 mm. In particular, for air gaps in the range of 0.2 mm to 0.5 mm the phase shift δ is up to 6°. This may result in irregularities of the operation of the combustion engine at the moment, when the basis for the determination of the switching signal is changed from TPO to the adapted switching threshold.

Figure 7:
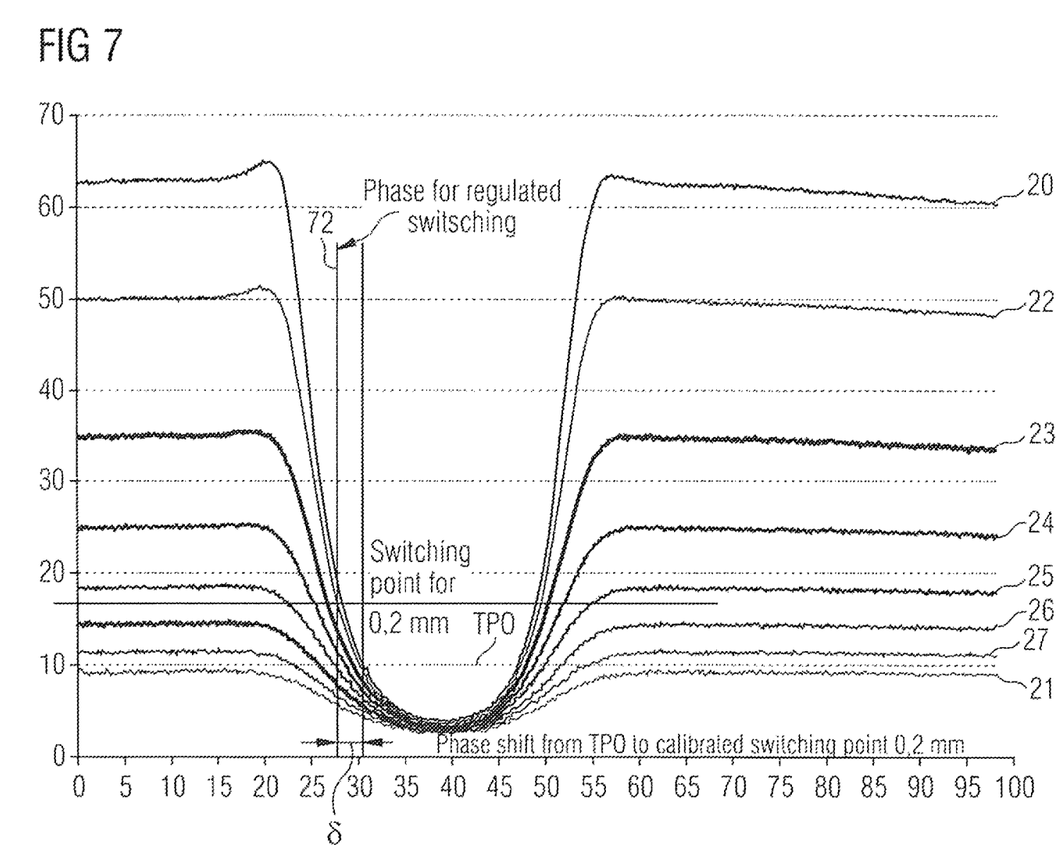
FIG. 7 displays a series of sensor signals recorded for different air gaps between a rotatable body and a sensor and indicates a regulated switching threshold based on the amplitude of the sensor signal.

In contrast to the above mentioned the present disclosure provides a different way to determine a switching threshold. One exemplary way of determining the switching threshold is presented by FIGS. 7 and 8. FIG. 7 presents the sensor signals 20 to 27, which are identical to those presented in FIG. 5, and the TPO level. With respect to the explanation of the sensor signals it is referred to the details mentioned above with respect to FIGS. 5 and 6. In some other embodiments the sensor signals 20 to 27 may be averaged sensor signals. The averaged sensor signals may be an average over x subsequently sensed oscillations or sensor signal amplitudes, wherein x is a natural number. In other embodiments the averaged sensor signals may be an average over all measured sensor signals (sliding average). In some other embodiments the averaged sensor signals may be an average over a number of oscillations corresponding to at least one particular portion of the coding pattern, e.g. of at least one particular tooth of the target body.

FIG. 7 illustrates in addition a vertical line 72 at a rotation angle of 28°. Said vertical line 72 crosses the sensor signals 20 to 27 at different ratios of the peak-to-peak amplitude of the corresponding sensor signal. However, it is found that the crossing points of the vertical line 72 and the sensor signals 20 to 27 are correlated to each other. In FIG. 7 it is shown that the phase shift from the TPO to the regulated switching point for small air gaps is reduced compared to the phase shift indicated in FIG. 5.

Figure 8:
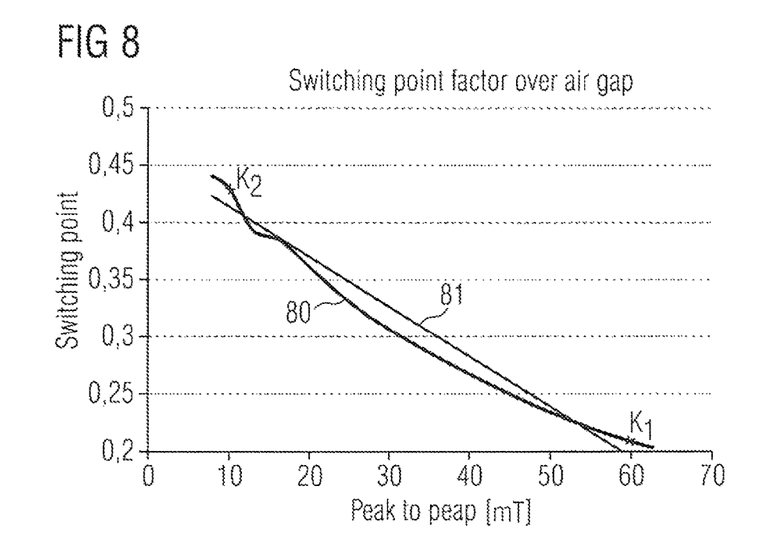
FIG. 8 represents the dependence of the regulated switching threshold from a sensor signal peak-to-peak amplitude.

In FIG. 8 the crossing points (line 80) indicated as ratios w1, w2 of the peak-to-peak amplitude of the sensor signals are presented as function of the peak-to-peak amplitude in the range of 10 mT to 60 mT. This range may cover a range of widths of air gaps from 2 mm (represented by a peak-to-peak amplitude of 10 mT) to 0.2 mm (represented by a peak-to-peak amplitude of 60 mT). Said ratios w1, w2 may be stored in some embodiments in a look up table as amplitude dependent weighting factors.

In order to determine the switching threshold, the minimum of the sensor signal and the peak-to-peak amplitude thereof may be determined and the switching threshold may be calculated as the sum of the minimum of the sensor signal and the product of the ratio corresponding to the determined peak-to-peak amplitude and hence the amplitude dependent weighting factor and the peak-to-peak amplitude. In other words, the switching threshold ST may correspond to:

$$ST = Min + (Max - Min) * w, \quad (I)$$

wherein Min is the minimal value of the sensor signal, Max−Min is the peak-to-peak amplitude and w is the amplitude dependent weighting factor, which may be one of the ratios w1, w2 stored in the look up table and corresponding to the sensed sensor signal. It is to be noted that the values of w1, w2 and hence the amplitude dependent weighting factor may further depend on the design and structure of the rotatable target body and the used magnetic field sensor.

In other embodiments the crossing points w1, w2 may be interpolated. Said interpolation may result in a linear function w(Max−Min) of the peak-to-peak amplitude as displayed by the interpolated line 81 of FIG. 8. In other words, it can be seen from FIG. 8, that for the normally used air gaps between 0.2 mm and 2 mm (60 mT to 10 mT) a linear dependency with ratio between 0.2 at low air gap and 0.4 at high air gap will deliver an accurate enough switching point. Thus, in some embodiments the switching threshold ST may be determined corresponding to $$ST = Min + (Max - Min) * w(Max - Min), \quad (II)$$

In the embodiment presented by FIG. 8, w(Max−Min) is a linear function of the peak-to-peak amplitude of the sensor signal. w(Max−Min) may be calculated by the formula:

$$w(Max - Min) = a + b / (Max - Min), \quad (III)$$

wherein a and b are constant values. In the embodiments presented by FIG. 8, a may be 0.2 and b may be 2.5. However, said constants may change dependent on the design and structure of the rotatable target body and the magnetic field sensor.

In some other embodiments the crossing points of the sensor signals with the regulated vertical line 72 may follow any other mathematical function of the sensor-signal amplitude, e.g. a hyperbolic function, a power function, an exponential function or a logarithmic function or any other suitable function.

In some embodiments the vertical line 72 may be set at any rotation angle, at which a switching signal shall be generated. The rotation angle may be any rotation angle, at which a coding pattern of the rotatable target body is recognizable in the sensor signal. In some implementations the vertical line 72 may be chosen at a rotation angle, which is in a medium range of the rotation angles, at which the sensor signals cross the TPO level. As can be seen from FIG. 8, the vertical line 72 is at a rotation angle of 28°, and the crossing points of the sensor signals 20, 22 to 26 with the TOP level are at angles in the range from 26° to 30.5°, so that the vertical line 72 is chosen substantially in the medium range of the crossing points of the sensor signals with the TPO. However, in other embodiments the regulated switching line (vertical line 72) may be chosen at other rotation angles dependent on the underlying design of the rotatable target body and the magnetic field sensor.

Generally speaking, the switching threshold is based on the sensor signal amplitude and a weighting factor, the weighting factor itself being dependent on said sensor signal amplitude. The sensor signal amplitude may be dependent on a width of an air gap between a rotatable target body and a magnetic field sensor. Thereby, it is possible to freely determine an angular position of the rotatable target body, at which the switching signal shall be generated. In some embodiments, further the phase shift between crossing point of the sensor signal with the TPO level and that between the sensor signal and the switching threshold can be reduced for a wide range of widths of air gaps.

Figure 9:
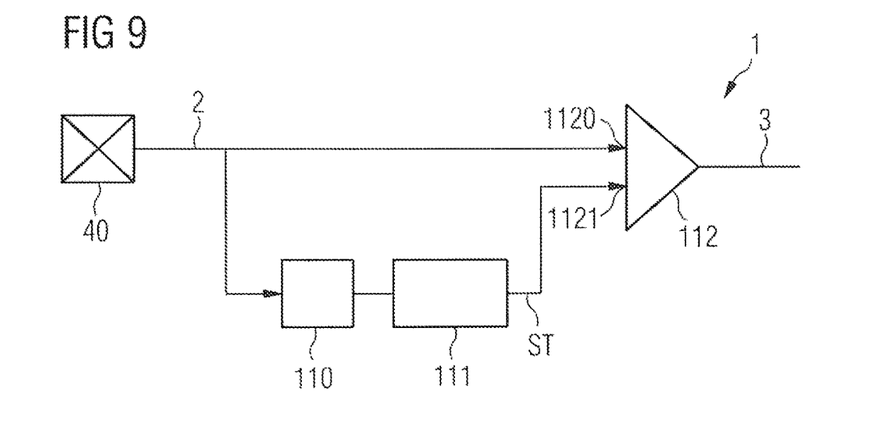
FIG. 9 represents an internal structure of the switching device of FIG. 1.

In the following two examples of possible configuration of the switching device 1 presented by FIG. 1 are described. FIG. 9 shows an embodiment of the switching device of FIG. 1, wherein switching device is coupled to a magnetic field sensor 40, which may be in some embodiments a chopped Hall sensor. The processing circuitry 11 may include an analog-to-digital converter 110, a determination unit 111 and a comparator 112.

The analog-to-digital converter 110 may be configured to convert an analog sensor signal 2 into a digital sensor signal, the digital sensor signal being used to determine the switching threshold. The analog-to-digital converter 110 may further be configured to determine a minimum level and a maximum level of the sensor signal.

The determination unit 111 may include a memory to store an amplitude dependent weighting factor. In some embodiments a look-up table may be employed. The look-up table may include different weighting factors w for different measured sensor signal amplitudes. In alternative embodiments the amplitude dependent weighting factor w may be stored as a function of sensor signal amplitudes interpolating a series of weighting factors, e.g. ratios w1, w2. This function may be a function w(Max−Min) of the peak-to-peak amplitude. The determination unit 111 may further be configured to determine a switching threshold corresponding to the amplitude dependent weighting factor w and the sensor signal amplitude. The sensor signal amplitude may, in some embodiments, be the difference between minimum and maximum. In some embodiments the switching threshold may be calculated by formula (I) using the look-up table, or by formula (II) using a functional relationship between w and the sensor signal amplitude. The determination unit 111 may further be configured to provide the switching threshold to the comparator 112. The determination unit 111 may either include a storage or may be connected to a storage unit, which stores information on the TPO level and about the dependence of weighting factor on the sensor signal amplitude.

The comparator 112 may have a first input 1120 configured to receive the sensor signal from the magnetic field sensor 40 and a second input 1121 configured to receive the switching threshold provided by the determination unit 111. The comparator 112 is configured to compare the sensor signal 2 with the switching threshold ST and to generate the switching signal 3.

In some embodiments the analog-to-digital converter 110 may be omitted. In this case, the function of determining the maximum and the minimum of the sensor signal 2 may be performed by the determination unit 111.

Figure 10:
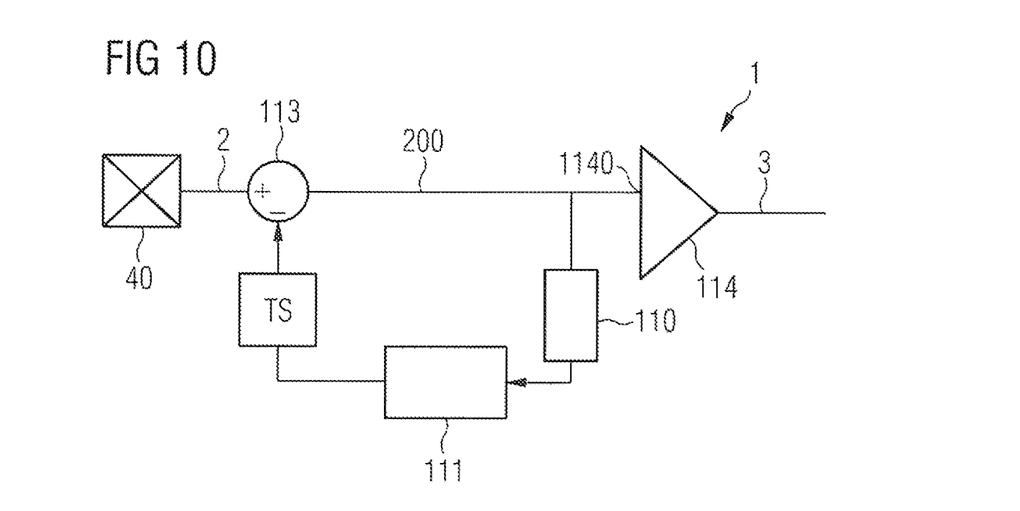
FIG. 10 illustrates another embodiment of the internal structure of the switching device of FIG. 1.

In other embodiments, the switching device 1 of FIG. 1 may be implemented as schematically shown by FIG. 10. In the example of FIG. 10 the switching device 1 is again coupled to a magnetic field sensor 40. The processing circuitry may include an operational amplifier 113, which is configured to provide the sensor signal 2 with an offset, an analog-to-digital converter 110, a determination unit 111 and a comparator 114.

The operational amplifier 113 may be configured to provide the sensor signal 2 received from the magnetic field sensor 40 with an offset. In some embodiments the offset may depend on the amplitude of the sensor signal. The operational amplifier 112 may be further configured to output an offset sensor signal 200.

The analog-to-digital converter 110 may be configured to convert the analog offset sensor signal 200 into a digital off sensor signal. The digital offset sensor signal may be used to determine the switching threshold TS. The analog-to-digital converter 110 may further be configured to determine a minimum level and a maximum level of the offset sensor signal 200.

The determination unit 111 may be configured to determine a switching threshold TS corresponding to a weighting factor and the sensor signal amplitude, the weighting factor being dependent on the sensor signal amplitude. The determination unit 111 may either include a storage or may be connected to a storage unit, which may store information on the TPO and about the dependence of the amplitude dependent weighting factor on the sensor signal amplitude. For further details of the determination procedure it is referred to the determination unit 111 of FIG. 9. The determination unit 111 may be configured to determine the switching threshold TS based on the sensor signal amplitude and the amplitude dependent and to output the switching threshold ST to the operational amplifier 113. In some embodiments the processing circuitry may further comprise a digital-to-analog converter to convert the switching threshold ST into an analog switching threshold signal before providing the switching threshold to the operational amplifier 113.

The operational amplifier 113 may be configured to provide the sensor signal 2 with an offset corresponding to the switching threshold TS. In some embodiments the offset may be in the size of the switching threshold. As indicates in FIG. 10, the digital-to-analog converter 110 and the determination unit 111 may be arranged to form a back loop and the switching threshold TS may be output to the operational amplifier 113 as offset.

The comparator 114 in the embodiment of FIG. 10 may have only one input 1140 for receiving the offset sensor signal 200 output by the operational amplifier 113, namely the sensor signal offset by the switching threshold. The comparator 114 may be configured to compare the received signal 200 with a zero point and to generate a switching signal 3, when the offset sensor signal 200 crosses the zero point.

It will be apparent to the skilled person that the switching device 1 of FIG. 1 and the previously described embodiments thereof may be configured to perform a corresponding switching method. A flowchart 900 of an exemplary embodiment of the method is illustrated in FIG. 12.

Figure 11:
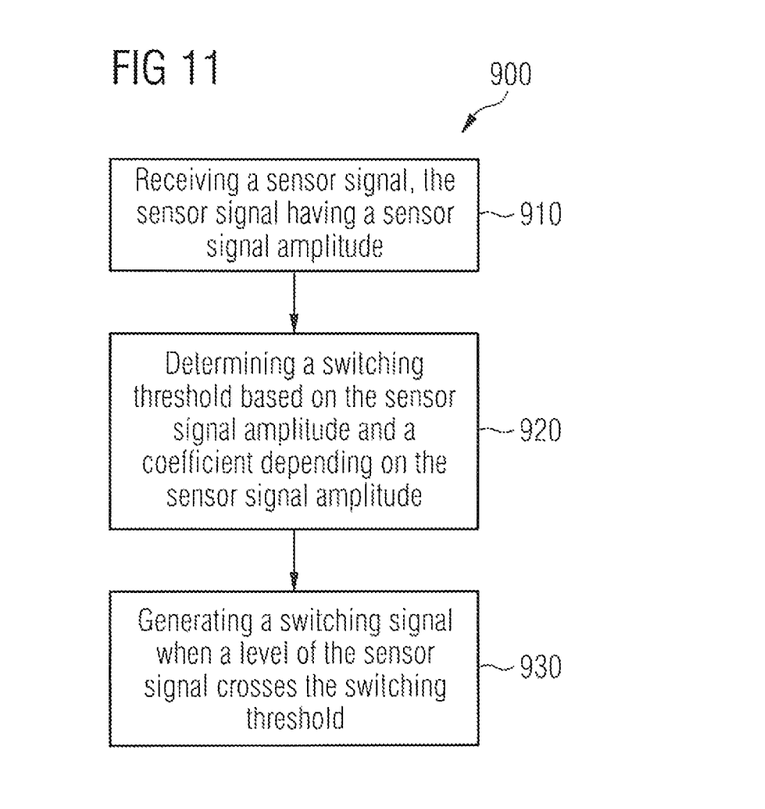
FIG. 11 illustrates a flow chart of a switching method to determine a switching signal based on a sensor signal amplitude.

The method 900 comprises a first step 910 of receiving a sensor signal. The sensor signal has a sensor signal amplitude. Method 90 further includes a second step 920 of determining a switching threshold based on based on the sensor signal amplitude and a weighting factor, depending on the sensor signal amplitude. A further step 930 comprises generating a switching signal when a level of the sensor signal crosses the switching threshold.

In some embodiments the sensor signal amplitude may be substantially constant. In other embodiments the sensor signal amplitude may vary with time or dependent on a design of the target body. The weighting factor may be adapted to the variations of the sensor signal amplitude during operation. The sensor signal amplitude may be indicative of a sensed magnetic field. The first step 910 may in some implementations comprise measuring the magnetic field with a magnetic field sensor spaced apart from a rotatable shaft by an air gap, the magnetic field indicating an angular position of the rotatable shaft, and the sensor signal having a sensor signal amplitude depending on the air gap.

The second step 920 may comprise determining the weighting factor proportional to the sensor signal amplitude. In some embodiments the weighting factor is determined inversely proportional to the sensor signal amplitude. In some embodiments the switching threshold may be the sum of the minimal level of the sensor signal and the sensor signal amplitude multiplied by the amplitude dependent weighting factor.

In some embodiments the weighting factor and hence the switching threshold may be adapted to variations of the sensor signal amplitude over time. In some implementations the sensor signal amplitude may be periodically verified and the weighting factor may be adapted, if the sensor signal amplitude has changed. In alternative implementations the sensor signal amplitude may be continuously monitored and the weighting factor may be adapted as soon as the sensor signal amplitude varies. The sensor signal amplitude may be the measured sensor signal amplitude or an average of measured sensor signal amplitudes.

In some implementations a switching signal may be generated when a level of the sensor signal falls below the switching threshold. In alternative embodiments the step 930 may comprise overlaying the sensing signal with an offset corresponding to the switching threshold and comparing the overlaid sensor signal with a zero point.

The switching method 900 may be used for providing a switching signal to control at least one of the group of a valve, an ignition device, or an injection device of a cylinder of a combustion engine.

In some embodiments the switching method 900 may allow to adapt the switching threshold over time. The switching method may be started at a starting time. A first maximum and a first minimum of the sensor signal may be determined right after the starting time and a weighting factor may be determined After determination of the amplitude dependent switching threshold from the weighting factor, a switching signal may be provided, when the sensor signal crosses the amplitude dependent switching threshold. Subsequently, a second maximum may be determined and the weighting factor may be adapted to amplitude of the first minimum and the second maximum or to an average amplitude.

In some embodiments a fixed switching threshold may be used to determine the switching signal right after the starting time. The amplitude dependent weighting factor may then be determined already after the first maximum of the sensor signal after the beginning of the operation (e.g. after start up or power up) is detected. A difference between the first maximum and a fixed switching threshold, such as the true power on value (TPO) may be calculated. This difference may be used as a first sensor signal amplitude to determine the weighting factor. As soon as a first minimum of the sensor signal is detected, the weighting factor may be adapted to the peak-to-peak amplitude corresponding to the first maximum and the first minimum. Subsequently, the adaptation may be continued as described above.

In some embodiments a weighting factor may be stored, which was used until the switching system was turned off for the last time. When the switching system is restarted, a switching threshold based on the stored weighting factor may be used before the processing circuitry detects the first maximum of the sensor signal.

To summarize, embodiments provide a novel concept for determining a switching signal usable for controlling an actuator such as a fuel injection device or an injection device. Some Embodiments allow determining a switching signal based on a sensor signal amplitude, indicative of a distance between a magnetic field sensor and a rotatable target body, and a weighting factor, wherein the weighting factor is dependent on the sensor signal amplitude. Distinguished from other concepts which, for example, provide only a learning of the switching threshold but not of the weighting factor, the embodiments herein can provide a learning and adaption of the weighting factor. The learned or adapted weighting factor is then used in combination with a determined signal amplitude to determine the switching threshold.

With a variable amplitude dependent switching point the regulated switching phase at known amplitude can be set in a wide range without loss of accuracy over air gap. If the regulated switching point is set near the initial switching point the phase transition from the first switching to the final one is minimized. The switching level can be calculated out of the minima and maxima of the signal and used as a reference level for a comparator (FIG. 10). Alternatively, the switching level can be calculated from minima and maxima of the signal and used as offset in a feedback loop and regulated so that a comparator switches in the zero point (FIG. 11). The comparator and the amplitude-dependent switching points can be realized in digital domain, if an ADC is used as direct input for the Hall signal. The amplitude-dependent switching point regulation can also be optimized to mechanical edges of a tooth instead to magnetic edges of a tooth.

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

Furthermore, the following claims are hereby incorporated into the Detailed Description, where each claim may stand on its own as a separate embodiment. While each claim may stand on its own as a separate embodiment, it is to be noted that—although a dependent claim may refer in the claims to a specific combination with one or more other claims—other embodiments may also include a combination of the dependent claim with the subject matter of each other dependent claim. Such combinations are proposed herein unless it is stated that a specific combination is not intended. Furthermore, it is intended to include also features of a claim to any other independent claim even if this claim is not directly made dependent to the independent claim.

It is further to be noted that methods disclosed in the specification or in the claims may be implemented by a device having means for performing each of the respective steps of these methods.

Further, it is to be understood that the disclosure of multiple steps or functions disclosed in the specification or claims may not be construed as to be within the specific order. Therefore, the disclosure of multiple steps or functions will not limit these to a particular order unless such steps or functions are not interchangeable for technical reasons. Furthermore, in some embodiments a single step may include or may be broken into multiple sub steps. Such sub steps may be included and part of the disclosure of this single step unless explicitly excluded.

The invention claimed is:

1. A switching device, comprising:
   an input for a sensor signal, the sensor signal having one or more sensor signal amplitudes; and
   processing circuitry configured to:
      determine a switching threshold based on the one or more sensor signal amplitudes and a weighting factor inversely proportional to a single sensor signal amplitude being a peak-to-peak amplitude of the sensor signal, wherein the single sensor signal amplitude is indicative of a gap between a magnetic field sensor providing the sensor signal and a rotatable target body, and
      generate a switching signal when a level of the sensor signal crosses the switching threshold.

2. The switching device of claim 1, wherein the processing circuit is configured to adapt the weighting factor to variations of the single sensor signal amplitude over time.

3. The switching device of claim 1, wherein the one or more sensor signal amplitudes comprise a peak-to-peak amplitude between a minimum and an adjacent maximum of the sensor signal.

4. The switching device of claim 1, wherein the processing circuitry is configured to determine the threshold based on a sum of a minimum of the sensor signal and a product of the weighting factor and the single sensor signal amplitude.

5. The switching device of claim 1, wherein the input provides an interface to a magnetic field sensor providing the sensor signal indicative of a sensed magnetic field.

6. The switching device of claim 5, wherein the magnetic field is generated by a back bias magnet placed behind a magnetic field sensor or by a magnetized ring wheel.

7. The switching device of claim 1, wherein the sensor signal is indicative of an angular position of a rotatable target body attached to or being a part of a camshaft or a crankshaft.

8. The switching device of claim 1, wherein the single sensor signal amplitude is a highest, a lowest or an intermediate sensor signal amplitude of the one or more sensor signal amplitudes.

9. The switching device of claim 1, wherein the processing circuitry comprises an output for the switching signal, wherein the output provides an interface to at least one actuator of the group of a valve controller, a fuel injection controller, or an ignition controller of a combustion engine.

10. The switching device of claim 1, wherein the peak-to-peak amplitude of the sensor signal is a difference between a minimum and an adjacent maximum of the sensor signal.

11. A switching system, comprising:
    a magnetic field sensor spaced apart from a rotatable target body by a gap, the magnetic field sensor being configured to output a sensor signal indicative of an oscillating magnetic field indicating an angular position of the rotatable target body, the sensor signal having one or more sensor signal amplitudes depending on a width of the gap; and
    processing circuitry that is configured to determine a switching threshold based on the one or more sensor signal amplitudes and a weighting factor inversely proportional to a single sensor signal amplitude being a peak-to-peak amplitude of the sensor signal, and to generate a switching signal when a level of the sensor signal crosses the switching threshold.

12. The switching system of claim 11, wherein the switching system further comprises at least one of a memory to store a fixed switching threshold constant for all sensor signal amplitudes or a memory to store a current weighting factor.

13. The switching system of claim 11, wherein the rotatable target body comprises a wheel attached to a rotatable shaft or a portion of the rotatable shaft, wherein the rotatable shaft is a camshaft configured to actuate at least an air inlet or an air outlet of a combustion chamber of a combustion engine, wherein the switching signal is adapted to control at least a fuel injection device of the engine or, wherein the rotatable shaft is a crankshaft configured to actuate at least a piston of a combustion engine, wherein the switching signal is adapted to control at least an ignition device of the engine.

14. The switching system of claim 11, wherein the rotatable target body comprises a coding pattern containing at least one of the group of a tooth, a slot, a hole or a region of inverted magnetic polarity.

15. The switching system of claim 11, wherein the rotatable target body comprises a metallic material and the system further comprises at least one magnet arranged at a side of the magnetic field sensor opposite to the rotatable target body or, wherein the rotatable target body comprises a magnetic material.

16. A switching method, comprising:
    receiving a sensor signal, the sensor signal having one or more sensor signal amplitudes;
    determining a switching threshold based on the one or more sensor signal amplitudes and a weighting factor inversely proportional to a single sensor signal amplitude being a peak-to-peak amplitude of the sensor signal, wherein the single sensor signal amplitude is indicative of a gap between a magnetic field sensor providing the sensor signal and a rotatable target body; and
    generating a switching signal when a level of the sensor signal crosses the switching threshold.

17. The switching method of claim 16, wherein the weighting factor is adapted to variations of the single sensor signal amplitude over time.

18. The switching method of claim 16, further comprising: generating a switching signal on the basis of a stored fixed switching threshold before a first maximum of the sensor signal is detected after starting the method, detecting the first maximum of the sensor signal, and determining the weighting factor on the basis of the fixed threshold and the detected maximum to generate a switching signal until a first minimum is detected.

19. The switching method of claim 16, further comprising: detecting a first maximum and a first minimum of the sensor signal after starting the method, and determining the weighting factor on the basis of the amplitude corresponding to the first maximum and the first minimum.

20. The switching method of claim 16, wherein receiving the sensor signal comprises measuring the magnetic field with a magnetic field sensor spaced apart from a rotatable shaft by a gap, the magnetic field indicating an angular position of the rotatable shaft, and the sensor signal having the one or more sensor signal amplitudes depending on the gap.

21. The switching method of claim 16, wherein the weighting factor is determined inversely proportional to the single sensor signal amplitude.

22. The switching method of claim 16, wherein generating the switching signal comprises determining, when a level of the sensor signal falls below the switching threshold, or overlaying the sensing signal with an offset corresponding to the switching threshold and comparing the overlaid sensor signal with a zero point.

* * * * *